July 2, 1929.                M. McEACHERN                1,719,668
                            DREDGING APPARATUS
                    Filed March 22, 1928        2 Sheets-Sheet 1
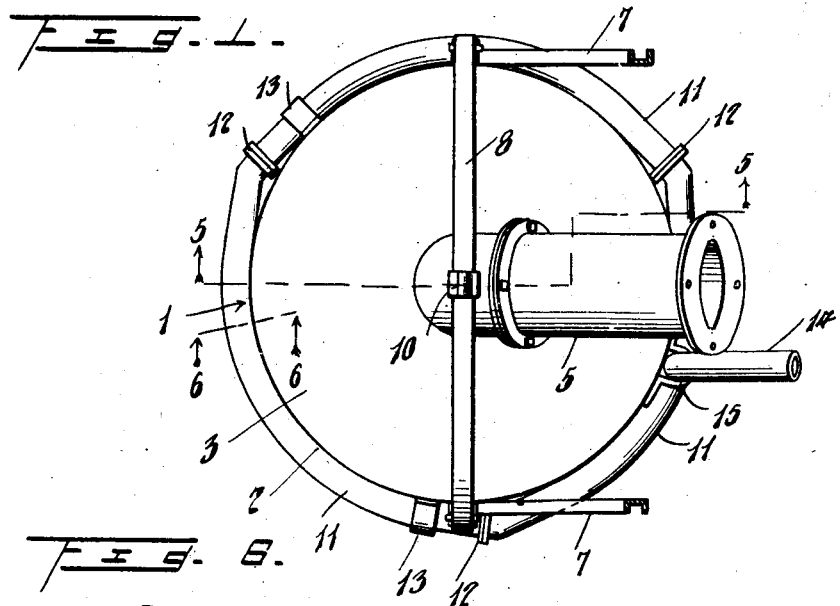
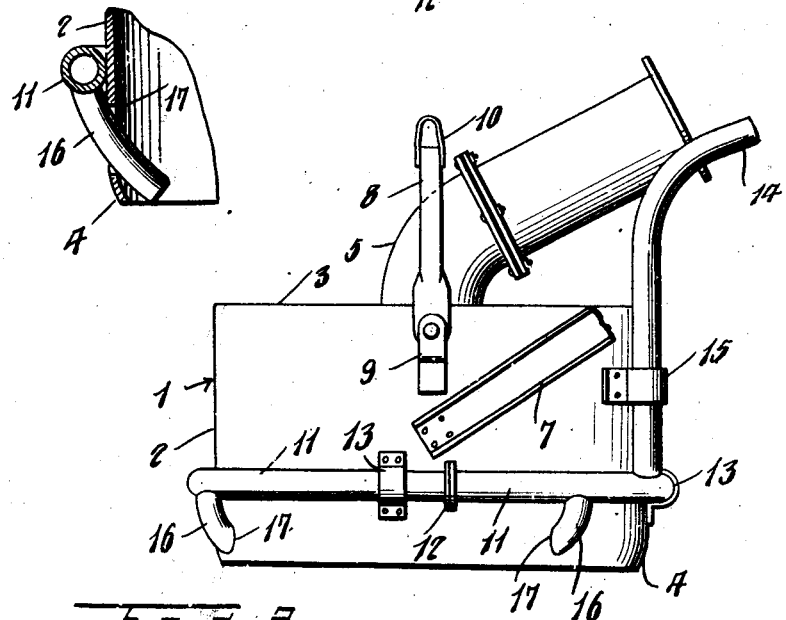
Inventor
M. McEachern.

July 2, 1929.  M. McEACHERN  1,719,668
DREDGING APPARATUS
Filed March 22, 1928  2 Sheets-Sheet 2
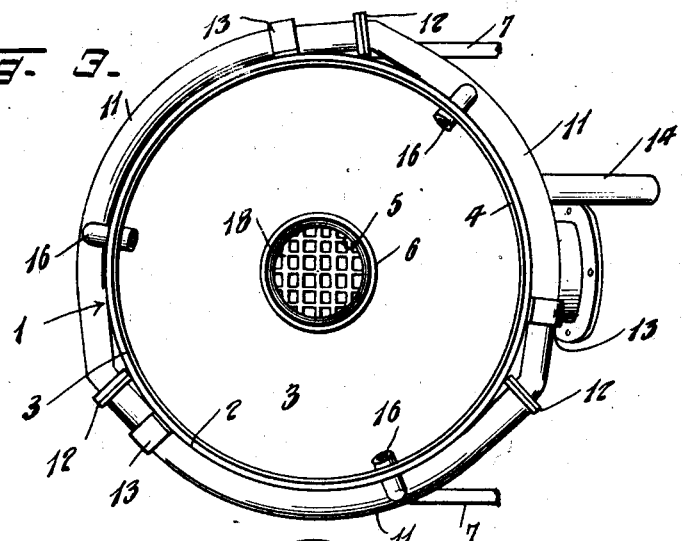
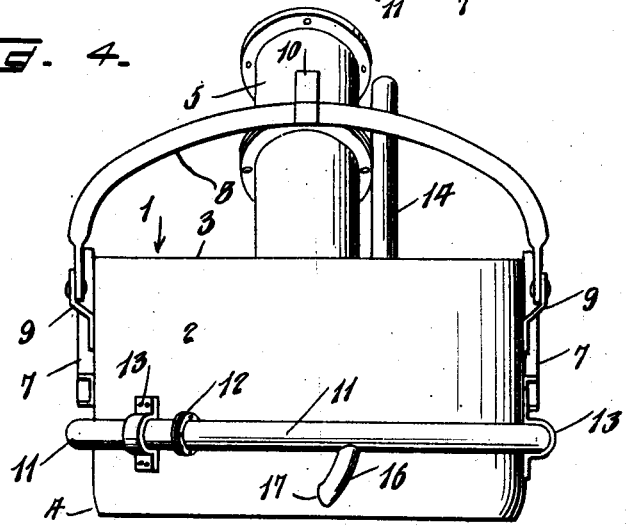
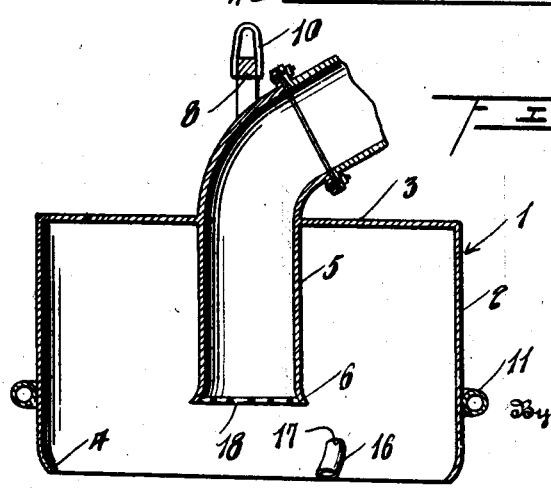
Inventor
M. McEachern.

Patented July 2, 1929.

1,719,668

UNITED STATES PATENT OFFICE.

MALCOLM McEACHERN, OF SPRINGVALE, MAINE.

DREDGING APPARATUS.

Application filed March 22, 1928. Serial No. 263,942.

The invention relates to dredging apparatus, and has particular reference to the suction drag comprising an inverted open ended cylindrical casing having one section of the suction pipe formed integral therewith extending into the casing, the end of the suction pipe within the casing being flared outwardly, and providing the drag with a hydraulic agitator comprising a pipe made in sections and surrounding the casing to contain water under pressure, nozzles leading from said sections to the casing and having their delivery end adjacent to the lower open end of the casing, the water delivered under pressure serving to agitate the material on the river bottom that is drawn with the water through the suction pipe.

A further object of the invention is the provision of a suction drag that is adapted for use in cleaning oyster beds of mud and other deposit.

The invention will be described in detail hereinafter and will be found illustrated in the accompanying drawings, in which Figure 1 is a top plan view of the suction drag, Figure 2 is a side view in elevation, Figure 3, a bottom plan view, Figure 4 is a front view in elevation, Figure 5 is a transverse sectional view on a plane indicated by the line 5—5 of Figure 1, and Figure 6 is a sectional detail on a plane indicated by the line 6—6 of Figure 1.

In the drawings, similar reference characters are used to designate corresponding parts throughout the several view.

The improved suction drag comprises a casing 1 having a cylindrical side wall 2, a top 3, and its lower end open, the open ended portions of the side wall 2 being inclined inwardly as shown at 4 to permit ease of movement of the casing over the bottom of the water course that is being dredged. A suction pipe-section 5 is formed integral with the casing 1 and extended through the top 3 and has its open end in the casing flared outwardly as shown at 6.

The channel beams 7 that are shown broken away, form the supporting arms for the drag and are connected to the dredge in the usual manner. 8 indicates a bail that pivotally engages ears 9 secured to the casing 1 and provided with a loop 10 for attachment of the host cable (not shown) usually employed in dredging machines for handling the suction drag.

A hydraulic agitator is provided for stirring up the mud and other deposit within the casing 1 when lowered in position on the river bottom, and comprises a pipe formed in sections, designated 11, and connected at joints 12 for removal and replacement of the sections, said sections being held in position surrounding the cylindrical wall 2 by means of brackets 13 secured to the wall. One of the sections 11 has a supply pipe 14 connected therewith and held in position by means of a bracket 15 for delivery water under pressure to the pipe sections 11. Connected with each of the sections 11 is a nozzle 16 that extends through openings 17 in the cylindrical wall 2, the delivery end of the nozzle 16, within the casing 1, being alined with the open end of the casing.

In using the improved drag it will be apparent that as the casing 1 is seated on the bottom of the water course that is being dredged and water under pressure is delivered through the supply pipe 14, the pipe sections 11, and the nozzles 16, that the mud and other deposit on the bottom of the water course would be agitated so that the deposit will be delivered with the water sucked through the suction pipe 5, and by movement of the casing 1 over the bed of the water course that the alluvial deposit will be readily removed from the bed of the water course.

As hereinbefore stated the device is also adapted for cleaning oyster beds of mud, sand, and other deposit, as it will be readily apparent that by moving the casing 1 over the oyster bed while the nozzles 16 are discharging water under pressure the deposits will be agitated and drawn through the suction pipe 5.

The receiving end of the pipe section 5 is provided with a grating or guard 18 to exclude rock and other solids too large to readily pass through a pump.

It is apparent that the drag is extremely simple in construction, and reasonable in cost of construction. Furthermore, as there are no wearing parts the cost of maintenance of the device will be extremely low, and in actual use it has been demonstrated that the operating cost of a dredge equipped with the improved drag is fifty per cent less than with any other devices now in use.

What is claimed is:—

In dredging apparatus, a drag including an inverted casing having a cylindrical side wall the edges of which are inclined inwardly, a suction pipe-section formed integral with said casing and extending through the top of the casing, the end of the suction pipe within the casing being flared outwardly, an agitator including a pipe for conveying water under pressure secured around the casing, and nozzles connected with said pipe and extending through openings in the cylindrical wall of the casing, said nozzles being directed downwardly and inwardly of the casing.

In testimony whereof I affix my signature.

MALCOLM McEACHERN.